US 9,208,005 B2

(12) United States Patent
Agarwal

(10) Patent No.: US 9,208,005 B2
(45) Date of Patent: *Dec. 8, 2015

(54) SYSTEM AND METHOD FOR PERFORMANCE MANAGEMENT OF LARGE SCALE SDP PLATFORMS

(75) Inventor: Manoj K. Agarwal, Noida (IN)

(73) Assignee: International Business Machines Corporation, Armonk, NY (US)

(*) Notice: Subject to any disclaimer, the term of this patent is extended or adjusted under 35 U.S.C. 154(b) by 209 days.

This patent is subject to a terminal disclaimer.

(21) Appl. No.: 13/595,690

(22) Filed: Aug. 27, 2012

(65) Prior Publication Data

US 2012/0320059 A1  Dec. 20, 2012

Related U.S. Application Data

(63) Continuation of application No. 12/607,350, filed on Oct. 28, 2009.

(51) Int. Cl.
*G06T 11/20* (2006.01)
*G06F 15/173* (2006.01)
*G06F 11/00* (2006.01)
*H04L 29/08* (2006.01)

(52) U.S. Cl.
CPC ............. *G06F 11/008* (2013.01); *G06F 11/00* (2013.01); *H04L 67/00* (2013.01)

(58) Field of Classification Search
CPC ............. G06F 11/008; G06F 11/3442; G06F 11/3447; G06F 11/3452; G06F 11/3457; G06F 11/3461; G06F 2201/875
See application file for complete search history.

(56) References Cited

U.S. PATENT DOCUMENTS

| | | | |
|---|---|---|---|
| 5,432,932 A * | 7/1995 | Chen et al. ................. 718/103 |
| 7,516,137 B1 | 4/2009 | Earle et al. | |
| 2005/0198259 A1* | 9/2005 | Childress et al. ............ 709/224 |
| 2007/0006177 A1 | 1/2007 | Aiber et al. | |
| 2008/0162232 A1 | 7/2008 | Gamarnik et al. | |
| 2008/0208659 A1 | 8/2008 | An et al. | |
| 2008/0288266 A1 | 11/2008 | Diao et al. | |

OTHER PUBLICATIONS

Manoj K Agarwal, Performance Management for Large Scale Service Delivery Platforms, Sep. 2009, 2009 IEEE International Conference on Services Computing, pp. 120-127.*
Using Rational Performance Tester Version 7, Mar. 2008, IBM International Technical Support Organization, IBM Redbooks, First Edition (Mar. 2008), pp. 1-548.*
Building SOA Solutions Using the Rational SDP, Apr. 2007, IBM International Technical Support Organization, IBM Redbooks, First Edition (Apr. 2007), pp. 1-610.*
Overview of WebSphere Studio Application Monitor and Workload Simulator, Apr. 2004, IBM International Technical Support Organization, IBM Redbooks, First Edition (Apr. 2004), pp. 1-174.*
IBM WebSphere Studio Workload Simulator User's Guide, Oct. 2003, IBM, Third edition (Oct. 2003), pp. 1-153.*

(Continued)

*Primary Examiner* — Jeffery A Brier
(74) *Attorney, Agent, or Firm* — Ference & Associates LLC

(57) ABSTRACT

Arrangements and methods for employing empirical evidence to estimate the performance of applications with very few data samples, in complex environments such as dynamic SDP environments, using one or more effective data-plotting models.

10 Claims, 4 Drawing Sheets

(56) References Cited

OTHER PUBLICATIONS

Pollack, K. T., et al., "Genesis: A Scalable Self-Evolving Performance Management Framework for Storage Systems", Proceedings of 26th IEEE International Conference on Distributed Computing Systems (ICDCS), 2006, 10 pages, IEEE Digital Library.

Zhang, S., et al., "Ensembles of models for automated diagnosis of system performance problems", Internet Systems and Storage Laboratory, Jan. 6, 2005, 15 pages, HP Laboratories Palo Alto, California, USA.

Kumar, V., et al., "A State-Space Approach to SLA based management", 2008, 8 pages, IEEE Digital Library.

* cited by examiner

SYSTEM AND METHOD FOR PERFORMANCE MANAGEMENT OF LARGE SCALE SDP PLATFORMS

CROSS REFERENCE TO RELATED APPLICATION

This application is a continuation of U.S. patent application Ser. No. 12/607,350, entitled SYSTEM AND METHOD FOR PERFORMANCE MANAGEMENT OF LARGE SCALE SDP PLATFORMS, filed on Oct. 28, 2009, which is incorporated by reference in its entirety.

BACKGROUND

In the sphere of web services, the mean time to deploy a new service has become an order of magnitude shorter than in earlier models, in which a solution typically is composed as a monolithic stack of software pieces. Accordingly, service delivery platforms (SDP) at present permit the rapid deployment of on line services. SDF platforms also offer a multi-tenant environment where deployed solutions can be shared by multiple businesses.

However, in such a context of multiple solutions and multiple tenants, basic management tasks can be encumbered with a challenging and dynamically evolving problems such as provisioning, monitoring and problem determination. Fault management is another management task that can present a challenge in an SDP environment.

Conventional arrangements are not sufficient to address these challenges mentioned above as they are either too slow or they are not scalable for dynamic environments and complex environments such as SDP.

Further, conventional methods do not present a unified approach to address all these challenges. All these approaches address one aspect of management functionality or another, but never a unified approach to enable simplified management of complex SDP environments.

BRIEF SUMMARY

Broadly contemplated herein, in accordance with at least one presently preferred embodiment of the present invention, are arrangements and methods for employing empirical evidence to estimate the performance of applications with very few data samples, in complex environments such as dynamic SDP environments, using one or more effective data-plotting models.

In summary, one aspect of the invention provides a method comprising: estimating expected performance of prospective new clients and existing clients of an SDP system via: obtaining performance data samples; plotting data corresponding to the data samples in a grid protocol; assigning at least one bound corresponding to acceptable performance; and ascertaining whether performance data satisfies the at least one bound.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
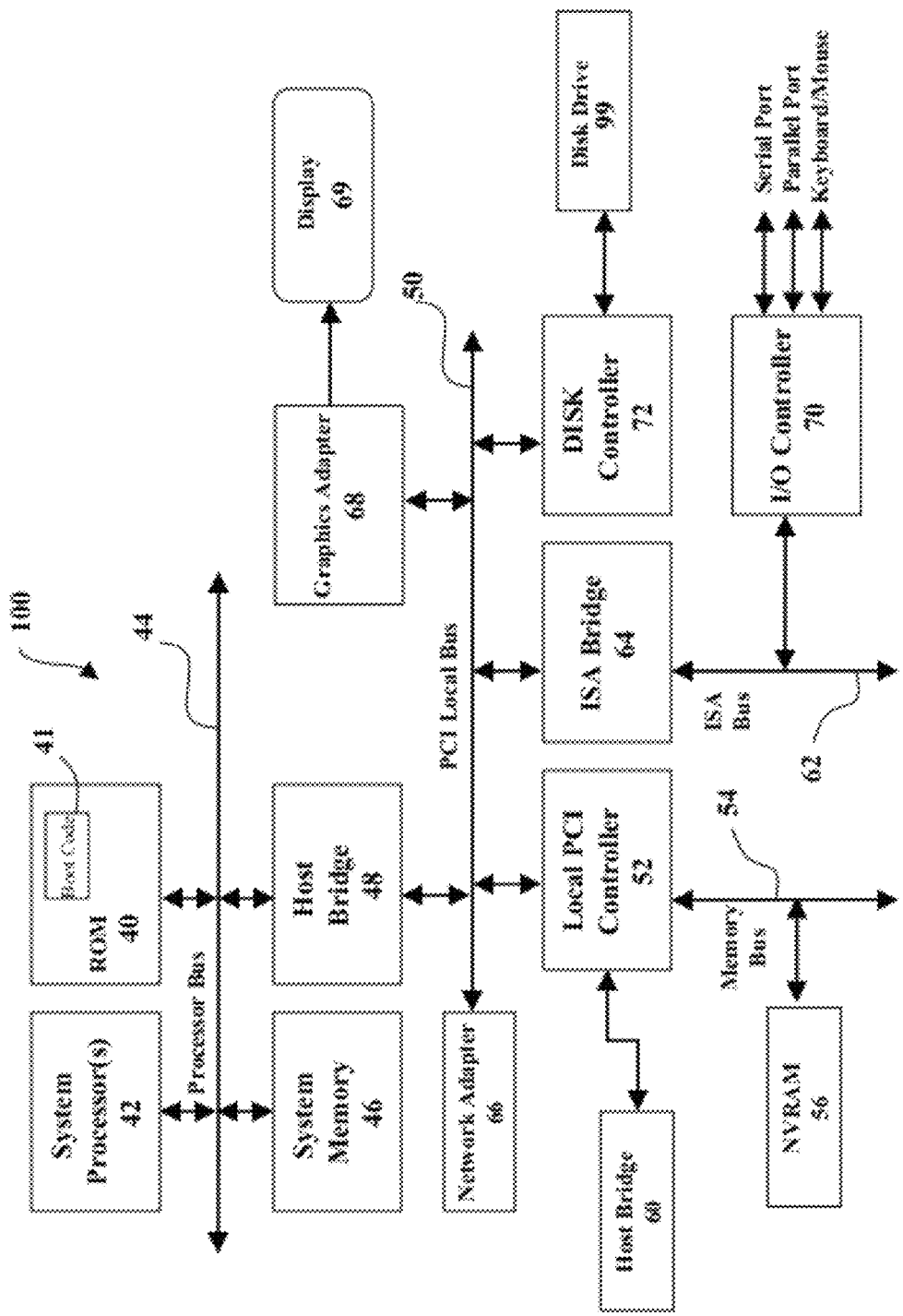
FIG. 1 illustrates a computer system.

It will be readily understood that the components of the embodiments of the invention, as generally described and illustrated in the figures herein, may be arranged and designed in a wide variety of different configurations in addition to the described presently preferred embodiments. Thus, the following more detailed description of the embodiments of the invention, as represented in the figures, is not intended to limit the scope of the embodiments of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings/figures. The following description is intended only by way of example and simply illustrates certain selected presently preferred embodiments of the invention as claimed herein.

Regarding the figures, the flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description now turns to the figures and select, presently preferred embodiments of the invention will be described. The following description of various embodiments of the invention is presented to highlight certain aspects of the invention, and the scope of the claimed embodiments of the invention will be pointed out in the appended claims.

Referring now to FIG. 1, there is depicted a block diagram of an illustrative embodiment of a computer system 100. The illustrative embodiment depicted in FIG. 1 may represent a device such as a game console, a set top box, a mobile device, a laptop, or a desktop or workstation computer. As is apparent from the description, however, embodiments of the invention may be implemented in any appropriately configured device or computing system, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to a LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, etc. A disk controller 72 connects a disk drive 99 with PCI local bus 50. The USB Bus and USB Controller (not shown) are part of the Local PCI controller (52).

Figure 2:
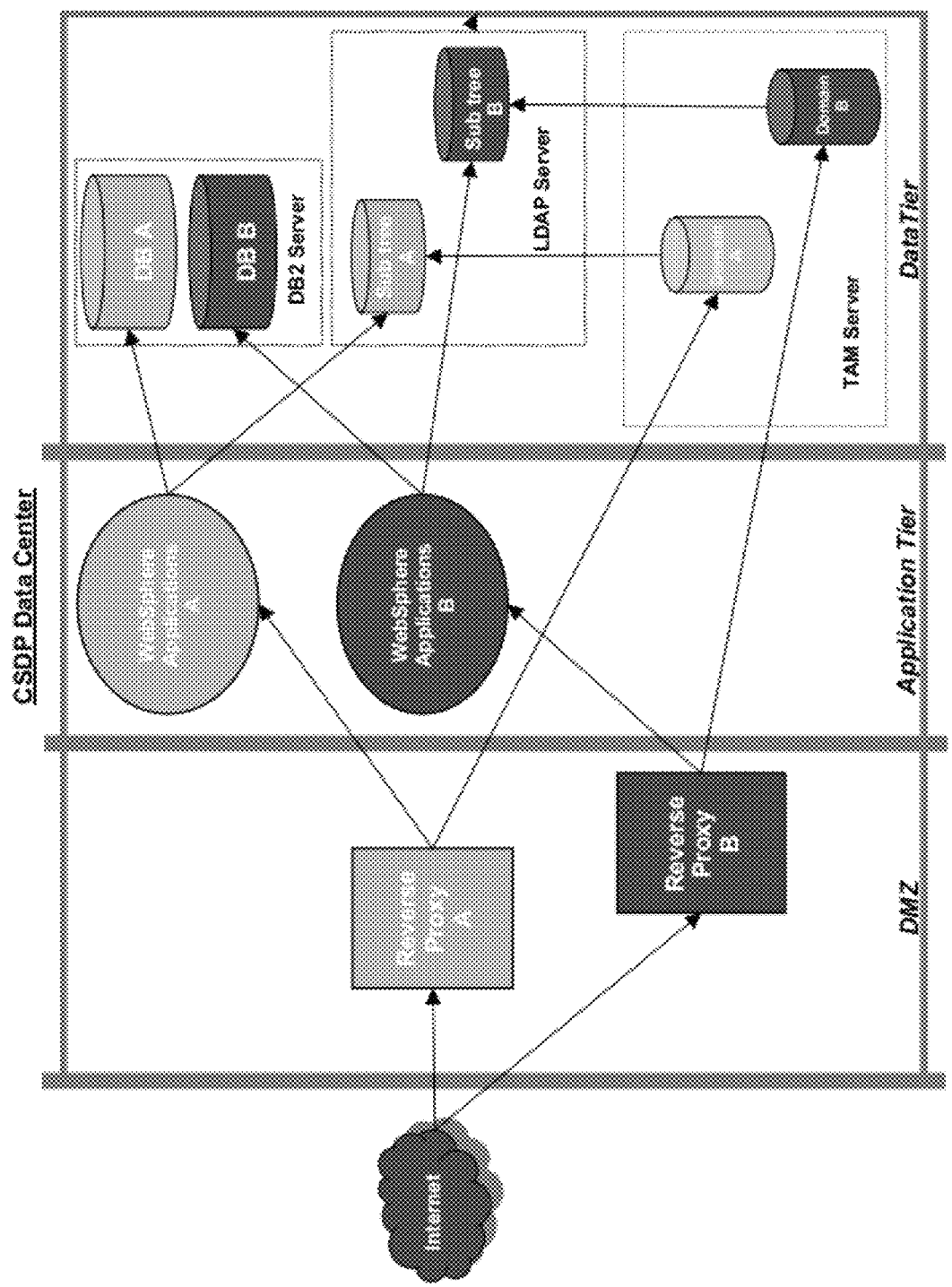
FIG. 2 schematically illustrates a typical SDP environment.

A typical SDP environment is schematically illustrated in FIG. 2. Generally, an SDP environment provides a service creation and execution environment and other management functionality such as metering, monitoring and fault localization. These platforms also offer a multi-tenant environment where deployed solutions can be shared by multiple businesses or other source.

For the purposes of illustration, consider a vendor, who is offering a software-as-a-service platform to host solutions, that would like to negotiate SLA guarantees for a new solution (or for a new tenant for an existing solution) such that new clients can be accommodated without violating SLA guarantees for any of the already installed applications. Simultaneously, the vendor may not wish to miss additional revenue by not admitting an admissible application. However, each new client in this environment brings in a different resources requirement. Under these conditions, some clients are admissible but some are not. This is classical admission control problem in a distributed environment, only with more complexity due to dynamicity and heterogeneity of the SDP environment.

Similarly, another important management task such as fault management can also present as a big challenge in an SDP environment. For instance, it can be difficult to detect bottlenecks or isolate faults quickly in the system in case of a failure. Throughput, latency and response time are typical parameters of performance for a client and these parameters depend on the current availability of resources in executing environment. Since resource utilization of servers in a service delivery platform is so dynamic, to figure out that the current performance seen by clients is due to a fault or due to insufficient resources is a very challenging problem. In one case, the system administrator needs to initiate a fault localization process whereas in another case s/he has to initiate a provisioning process.

Each of the management problems listed above, be it SLA management, admission control, fault management or provisioning, has hitherto been handled separately, but it has been found that at the root of each of these management challenges is the difficulty for system administrator to estimate the expected performance under a particular operating condition, as explained further herebelow. The problem is further compounded by the fact that SDP platforms are much more dynamic and heterogeneous compared to traditional enterprise environments.

In this very dynamic environment, such as modern service delivery platforms, it is non-trivial for system administrator to find bounds on performance with a small number of data points available since the crucial requirements of any such technique is to get the estimate of performance under a wide range of operating conditions quickly.

Accordingly, there are broadly contemplated herein, in accordance with at least one presently preferred embodiment of the present invention, arrangements and methods for employing empirical evidence to estimate the performance of applications with very few data samples, in a dynamic SDP environment, using a Datagrid model or an analogous model. Datagrid, for its part, is part of IBM's Common Service Delivery Platform (CSDP) which is a 3-tiered SOA architecture for building services solutions. (It should be noted that in accordance with embodiments of the present invention, the Datagrid model represents but one illustrative and non-restrictive possibility that may be employed; other, analogously functioning models can also be used.

It will be appreciated from the ensuing discussion that techniques employed in accordance with at least one presently preferred embodiment of the present invention offer a unified approach for various management tasks. Further, conventional techniques tend not to be scalable for large scale SDP environments, even for fault management tasks. The primary reason is these techniques can differentiate between a faulty and non-faulty performance only under the conditions for which they have already recorded a model. However, since SDP environments are so dynamic, the operating conditions continuously change. Hence, the conventional techniques either may not find any performance model under desired operating conditions or they are simply too slow for an SDP environment.

Turning to some simple observations, consider a cluster of n nodes for serving the workload of an application. If the number of nodes reduces without any change in workload, one expects to see an increase in response time. Similarly, if the number of nodes increases, one expects the response time to reduce. In the above example, the response time of the application, in an n-node cluster, is the lower bound on response time for clusters smaller than n assuming that the incoming load remains same. Similarly, the response time of application with an n-node cluster is the upper bound for a cluster of nodes greater than n with same incoming load. A similar observation is true for other metrics in the system as well.

In accordance with a preferred embodiment of the present invention, this simple observation can be exploited in an algorithm such that when the utilization of available resources increases, the performance of the system degrades and when the availability of resources increases, performance improves. Hence, if a model of an application has been learned under certain operating conditions that were different from current operating conditions, the model can still be used to get a lower or upper bound on the expected performance from the system under current conditions.

In a real world scenario, of course, it is a non-trivial task to get good bounds on the expected performance of an application. Naturally, one would normally prefer these bounds to be as tight as possible but nonetheless, these bounds do give good indications of expected performance. These bounds can further be used for various system management tasks. However, it can preferably be assumed in accordance with at least one embodiment of the present invention that the performance of an application under fault will be even inferior to performance of that application with slightly less resources available to it albeit without any fault. This would appear to be a reasonable assumption for most faults in a system.

Turning now to an algorithm that may be employed in accordance with a presently preferred embodiment of the present invention, consider that there are M parameters defining the state of a system. Examples of these parameters can include, but by no means would be limited to, e.g., the number of nodes in a cluster, CPU utilization, memory, disk I/O, current load on the system etc. By way of choosing a parameter to define the state of the system, preferably the granularity of the parameter will be consistent with the level of the system being monitored. For example, if a cluster of nodes is being monitored, CPU utilization can be computed as average CPU utilization across all nodes in the cluster.

Preferably, average response time (RT) of an application is monitored as a parameter for performance. The performance model can be easily extended by including parameters like throughput and latency to incorporate complicated SLA definitions. For each monitored metric, its value is preferably first mapped to a natural number using a function corresponding to that metric (an explanation of how such functions can be generated is provided hereinbelow). For example, for CPU utilization value v, its corresponding discrete value would be $$d_{cpu} = F_{cpu}(v_{cpu})$$

Similarly, each parameter is preferably converted into its corresponding discrete value. Hence for each parameter $i \in \{1 \ldots M\}$, a particular range of their values is mapped to a quantized value. The state of the system at time t is thus defined as a tuple:

$$S_M^t = <d_1^t, d_2^t \ldots d_M^t>$$

These quantized values for each monitored parameter mark the state of the system. The tuple thus generated is used to generate a key for that model. By automatically mapping the state of the system to a key, the task of updating and maintaining various models in the system is greatly simplified. Hence, when the system is in a particular state, with the help of quantization functions, a key is automatically generated. When a data point is generated at the end of a sampling interval, if a model corresponding to the generated key is already present, the model is updated. Otherwise, a new model is preferably created with this key and initialized with the corresponding performance model.

Preferably, these discretized values can also be interpreted as the coordinates of the quantized cell in M-dimension space, where M is the number of metrics being monitored. (Since the state of the system is mapped to an M-dimensional space, the terms 'parameter' and 'dimension' can be considered here as interchangeable, depending on the context.) This space may be termed a datagrid, and indeed in FIG. 3, an exemplary 2-dimensional datagrid is depicted. (Again, datagrid, which is implremented as part of the management module in the IBM CSDP platform referred to hereinabove, represents but one illustrative and non-restrictive example of a grid protocol that may be employed in accordance with at least one embodiment of the present invention. Preferably, there is also kept track of the number of samples recorded for each model in datagrid. For each model in the datagrid, the mean value and standard deviation of response time are preferably kept using exponential moving weighted average (EWMA) as follows:

$$\mu_n = \alpha \cdot x_n + (1-\alpha) \cdot \mu_{n-1}$$

$$\sigma_n^2 = \alpha \cdot (x_n - \mu_{n-1})^2 + (1-\alpha) \cdot \sigma_{n-1}^2$$

where $0 < \alpha < 1$ is a damping factor, chosen by an administrator.

Preferably, quantization functions are employed that map the observed value of monitored metrics to a quantized value. Preferably, the quantization functions are initialized with values chosen as per the SLA level policies and the system administrator's domain knowledge. For instance, all values between 10% and 20% for CPU utilization may be mapped to same discrete value.

Since these quantization functions are preferably initially defined by the system administrator based on one or more high level policies, it is possible that as more samples are collected and the system administrator gains better understanding of performance of system, s/he might wish to employ finer-grained models for samples in a region if the volatility level of samples in that region is high. To measure volatility, for each model in datagrid one can compute the coefficient of variation ($C_v$) as follows:

$$C_v = \frac{\sigma}{\mu}$$

where $\sigma$ and $\mu$ are standard deviation and mean respectively. If $C_v \geq \delta$, then preferably the quantization parameters are further sub-divided along some of the dimensions in that region.

Once it is found that a model needs to be sub-divided, there should also preferably be found such parameters (out of M) for which there is a need to divide the model, since the performance model may show high variability only for few parameters. Since it may well not be known as to which parameters are more sensitive in that particular model, strategy as follows may preferably be adopted. Preferably, the graph long each dimension may be traversed within a range of maxDist. For this, the value of a key for a dimension j may be changed as follows:

$$d'_j = d_j \pm i; 1 \leq i \leq \max \text{Dist}$$

$$S'_j = <d_1, d_2 \ldots d'_j \ldots d_M> \forall j \in \{1 \ldots M\}$$

Figure 3:
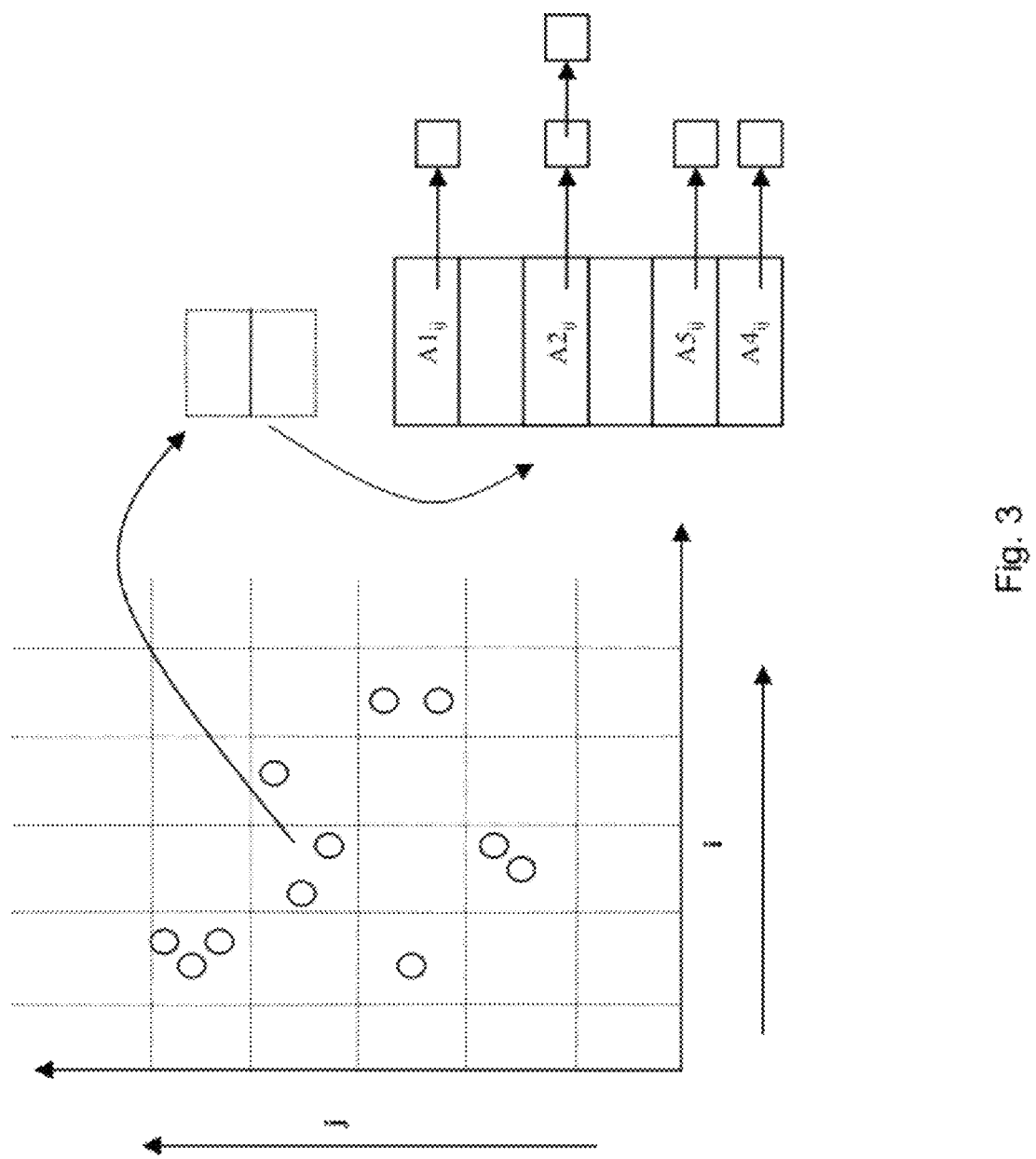
FIG. 3 graphically illustrates a state of a system as recorded on a graph.

If a model is present with key $S'_j$, this is preferably plotted in a two dimensional graph where one dimension is the parameter that is changing and other is the corresponding performance such as response time. By traversing along only one dimension, it is ensured that for all the models along that dimension, only the corresponding metric is changing and the rest are fixed. A two dimensional graph of all performance models thus created is preferably drawn with respect to that parameter. If it is found that the curve obtained is super-linear, then preferably the model is divided along that dimension (i.e., parameter), otherwise no division is undertaken. In this manner, one can compute all the dimensions for which there is a need to change the quantization parameter. Each such volatile dimension can then be divided into two equal sub-regions. If no models are found in the maxDist range for a parameter, then a division is preferably taken along that dimension (as there may well be a need to look at finer granularity for that parameter). As shown in FIG. 3, model $A_2$ is required to be divided along the CPU-axis due to high volatility along that dimension.

It may turn out that models divided at an earlier time may need to be merged, as volatility may be reduced with changing operating conditions or more samples may provide a better estimate of means and standard deviations. Preferably, only those models which were divided earlier will be merged while models at an initial granularity state will not be merged (even if they could be merged along a particular dimension, since such merging would change the granularity level with which the system administrator might be comfortable). Hence, based on empirical evidence, the datagrid is made only more fine grained and not vice-versa.

Since the coefficient of variation ($C_v$) is maintained as a basic condition for each model to remain intact, it should preferably be ensured that whenever any two models are merged, $C_v$ of the merged model is within the threshold limit $\delta$. To check if two models will have their coefficient of variation after merger within the threshold, preferably there is first computed the weighted mean of two models as follows:

$$\mu^* = \frac{\sum_i n_i \mu_i}{N}, N = \sum_i n_i$$

Thence, two models are preferably merged if the following condition is satisfied:

$$\frac{\sum_i n_i \sigma_i^2}{N} < \chi(\mu^*)^2 - \frac{(\Delta\mu)^2}{\beta}; \Delta\mu = |\mu_1 - \mu_2| \quad (1)$$

$$\text{where } \chi < \delta \text{ and } \beta = \sum_i \frac{1}{n_i}.$$

This condition (marked just above as [1]) is obtained by computing the joint standard deviation of merged models and comparing the same with the coefficient of variation threshold. Since only two models are merged at a time, i∈{1,2}. This equation that two models will be merged can be interpreted only when both the models have low variance and have sufficiently proximate means. Hence this condition intuitively satisfies the merging criteria.

With finer grained models for certain regions in the space, whenever on needs need to update a model, the search for a model can preferably become hierarchical. For instance, for an incoming data point, one may first find the corresponding model by mapping that to a key as explained further below. If that model is further sub-divided, a search again is preferably made for the right sub-model within that space. This continues until the lowest level model (or most fine grained model) is reached corresponding to that data point. Once the right model is found, it is updated with the data point in question.

By way of searching for a model in datagrid, let it be assumed (for illustrative and non-restrictive purposes in accordance with at least one embodiment of the present invention) that each monitored metric is divided in $N_i$ ranges i∈{1 ... M} There are a total of M metrics defining the state of the system. Hence, the total numbers of quantized cells that can exist in the system are:

$$Q_M = \prod_{i=1}^{M} N_i$$

In a real world system, most cells might not contain any performance model. (In an implementation of datagrid in accordance with at least one embodiment of the present invention, there are only as many data points as there are actual models in the grid. Thus, a space requirement will be linear in terms of the number of data models present.)

At each sampling interval, the state of the system is preferably first converted into a tuple (or key) that forms a data point in this M-dimensional space. These performance models are scattered in the datagrid. As shown in FIG. 3, only a few of the cells are filled with data points. These data points are stored in a hash table as shown in the right side of figure. Model A2 is further divided in two sub-models due to higher volatility.

When the system administrator needs the performance model of the system under certain operating conditions and there is no corresponding performance model present, preferably the closest model with respect to the required model is located such that the closest model gives the best bound on the performance model of the required model. For example, in case of absence of an exact model, if one is looking for an upper bound on a performance model, a search is preferably made for the model in which the tightest upper bound on performance is given. $L_1$-norm is preferably used as a measure of distance.

Hence, to locate the closest model, a search is first preferably made for any model within the distance of 1. If no such model is found, the search distance is preferably iterated upwardly by 1. This upward iteration can continue to expand the search distance until either a model is found or the search distance reaches the maximum value maxDist, since it would be undesirable to fetch a model from conditions which are vastly different from the required condition. Preferably, if more than one model is found within one of the iterative steps just mentioned, that model representing the tightest bound is chosen. Preferably, the maxDist parameter is a tunable parameter. The $L_1$-norm distance between two cells in the datagrid can be computed as follows:

$$dist = \sum_{i=1}^{M} |d_i^0 - d_i^j|,$$

where $<d_1^0, d_2^0 \ldots d_M^0>$ and $<d_1^j, d_2^j \ldots d_M^j>$ are the tuples corresponding to the reference model and the current model under consideration (or co-ordinates of a cell in M-dimensional space).

If in the process of finding a bound, a cell is reached that has been further sub-divided as explained hereinabove, preferably an appropriate model is chosen by ensuring that a proper bound is obtained. For instance, if the upper bound is sought, preferably it will be ensured that the lower and upper boundaries of all the dimensions are greater than or equal to the corresponding values of the dimensions of the model for which an upper bound is sought. If $d_u$ and $d_l$ are the upper and lower boundaries for a particular dimension of a model, it is thus ensured that $$d_{ui}^j \geq d_{ui}^0; d_{li}^j \geq d_{li}^0 \forall i \in \{1 \ldots M\}$$

Preferably, models are searched for solely in a quadrant that is deemed relevant. For example, in case of absence of exact model, if an upper bound is sought, the search preferably will be made only in the quadrant where, due to higher resource utilization, a performance model results in an upper bound. Similarly, a lower bound is sought, the search quadrant is preferably similarly chosen appropriately. As can be easily verified, at distance i there are covered $(1+i)^M/M$ cells in the required quadrant in datagrid. Hence, for a uniform distribution of models in the datagrid the probability of finding a bound increases by $(1+i)^M/M$. For M=10 and maxDist=2, four (4) orders of magnitude of improvement are obtained in the probability of finding a reasonable upper bound. If multiple models are found at a particular distance, the model with the tightest bound is preferably chosen.

Presented hereabove in Table I is an exemplary algorithm, in accordance with a preferred embodiment of the present invention, for finding a closest model in datagrid.

TABLE 1

Algorithm Finding Closest Model in datagrid

```
/* If no model is found within maxDist, this method returns null*/
getClosestModel (dataValues[m])
DataModel dm = NULL; /*closest data model representing tightest
available bound in datagrid.,*/
    distance = 1;
    MAX_DISTANCE = proerties.getMaxDist( );
while (distance <= MAX_DISTANCE)
    dm = datagrid.getModel(dataValues, distance)
            if (dm !=NULL)
                return dm;
            distance++
            return dm;
getModel(dataValues[m], distance)
key = getKey(dataValues); /*quantization of data values to generate key
for current data values*/
    keySet = getAllKeysAtDist(key, distance) /*set of all keys at distance
i from reference model key*/
for i=1 to keySet.size( )
    DataModel dm = datagrid.getModel(keySet(i));
    if (dm != NULL)
        while (dm.subdivided)
            dm = getClosestSubModel(dataValues, keySet(i))
        return dm;
return dm;
```

As touched on hereinabove, another important aspect of a general algorithm is setting of maxDist parameter. If maxDist is set too low, proper bounds might not be found or the system might become too slow. On the other hand, if maxDist is set too high, the bounds may be too loose to be meaningful.

Volatility in an SDP environment is another aspect to consider while setting the maxDist parameter. If volatility is low, one may decide to set maxDist low since most of the data points would be scattered in close range of each other. If volatility is high, however, the reverse would be true. Hence, the system administrator should preferably set the maxDist parameter judiciously by taking into account current operating conditions and accuracy requirements. As seen earlier, at distance i, the total number of cells covered in datagrid is $(1+i)^M/M$.

From above equation, to get an increase of x order of magnitude in probability of finding a bound, maxDist is preferably set as follows:

$$\log(1 + \max Dist) \geq \frac{x + \log M}{M}.$$

On, the other hand, if it is assumed that the performance model is piece wise linear with respect to metrics in relatively small range, in order to get good estimate of bounds, one may restrict the maxDist such that it does not cover more than y % of distance in any direction in datagrid, assuming that within y % distance, the performance remains piece wise linear with respect to metrics. If each metric is divided in $N_i$ ranges i∈{1 . . . M}, a conceivable rule to set maxDist can be as follows:

$$\max Dist \leq y \times MIN(N_i)/100; i \in \{1 \ldots M\}$$

In experimentation, it has been found that a good estimate of y is in the range of between about 10% and about 20%.

Whenever there is a sudden change in performance of the application, a trigger that may be referred to as "Breach Predictor" (or BP) may be enabled. The triggering change could be due to a fault in the system or due to other administrative actions such as installation of a new application. Once the trigger is obtained, there is preferably fetched an appropriate model based on the current values of the monitored parameters such that the performance model of this fetched model would present the tightest upper bound on the expected performance. If the system's current performance is inferior with respect to the fetched model, the system can be declared faulty. It can thus be appreciated that models are learned under non-faulty conditions, wherein as soon as a trigger is received from BP, the models cease to be updated until the system returns to a healthy state.

If there is no model found within maxDist, the system can be declared faulty nevertheless and thus prompt the system administrator to take further action. Further as discussed hereabove, the datagrid can be used to differentiate faulty conditions from provisioning issues. For example, one may need to provision extra resources if the discovered upper bounds from the datagrid on the performance model of the system are such that though these bounds do not indicate a fault, they may indicate the impending breach of SLAs if additional resources are not deployed.

Datagrid can be used for other administrative tasks such as SLA management and admission control. For instance, to admit any new client on the SDP infrastructure, the system administrator can easily verify that the new client on-board, will not cause existing clients to violate their SLA guarantees. They can do so by fetching a model that will constitute the upper bound on the performance for the existing clients under new conditions. New conditions are input to the system. If this bound compares favorably with the SLA, the new client can be admitted, otherwise not. (One can easily construct an upper bound for an existing application by reducing the cluster size gradually until the required bound is hit. If SLA's start to be violated for existing applications before finding an upper bound, then the new application is preferably not admitted.)

Similarly with the new application on-board, if it is found that the lower bound on performance from the datagrid violates SLA guarantees, then preferably a new client is not admitted. For negotiating an SLA agreement, if the system administrator finds that with available resources the lower bounds on the performance under expected conditions are inferior to the promised SLA, s/he can not offer those SLA guarantees unless additional resources are provisioned. Hence it can be seen that the datagrid acts as a multidimensional discrete joint probability distribution function of various parameters without the necessity of complex mathematical modeling or the slow process of empirical data collection, and can be deployed for various system management tasks.

By way of analysis, it was seen hereinabove that, while negotiating SLA's, one can construct an upper bound on the performance of the system with the aid of datagrid. This can be done since the system administrator proactively participated in admission control and SLA management. But fault management will be a difficult task since faults happen asynchronously without prior knowledge of system administrator.

How does one deal with a situation wherein no model is found within a range (maxDist) that forms the upper bound on the performance when such an upper bound might be needed? This situation largely arises only when the system has not seen the current level of incoming transaction loads in the past. If system has indeed seen these loads then there preferably indeed should exist an upper bound on the performance and resource utilization. Hence, if the resource utilization of the system is higher then those upper bounds even when the current incoming load is lower, it clearly indicates a faulty condition and is easily detected by a system as broadly contemplated in accordance with at least one embodiment of the present invention herein. Hence, if the values of monitored metrics change due to a fault in the cluster (which is quite often the case), one can easily detect this condition. This is a significant improvement over conventional efforts.

In a condition wherein the system has not seen the workload at a certain level and hence it does not have any upper bound for performance in datagrid, and if the system is not violating SLA bounds, then current performance can preferably be accepted as good.

Figure 4:
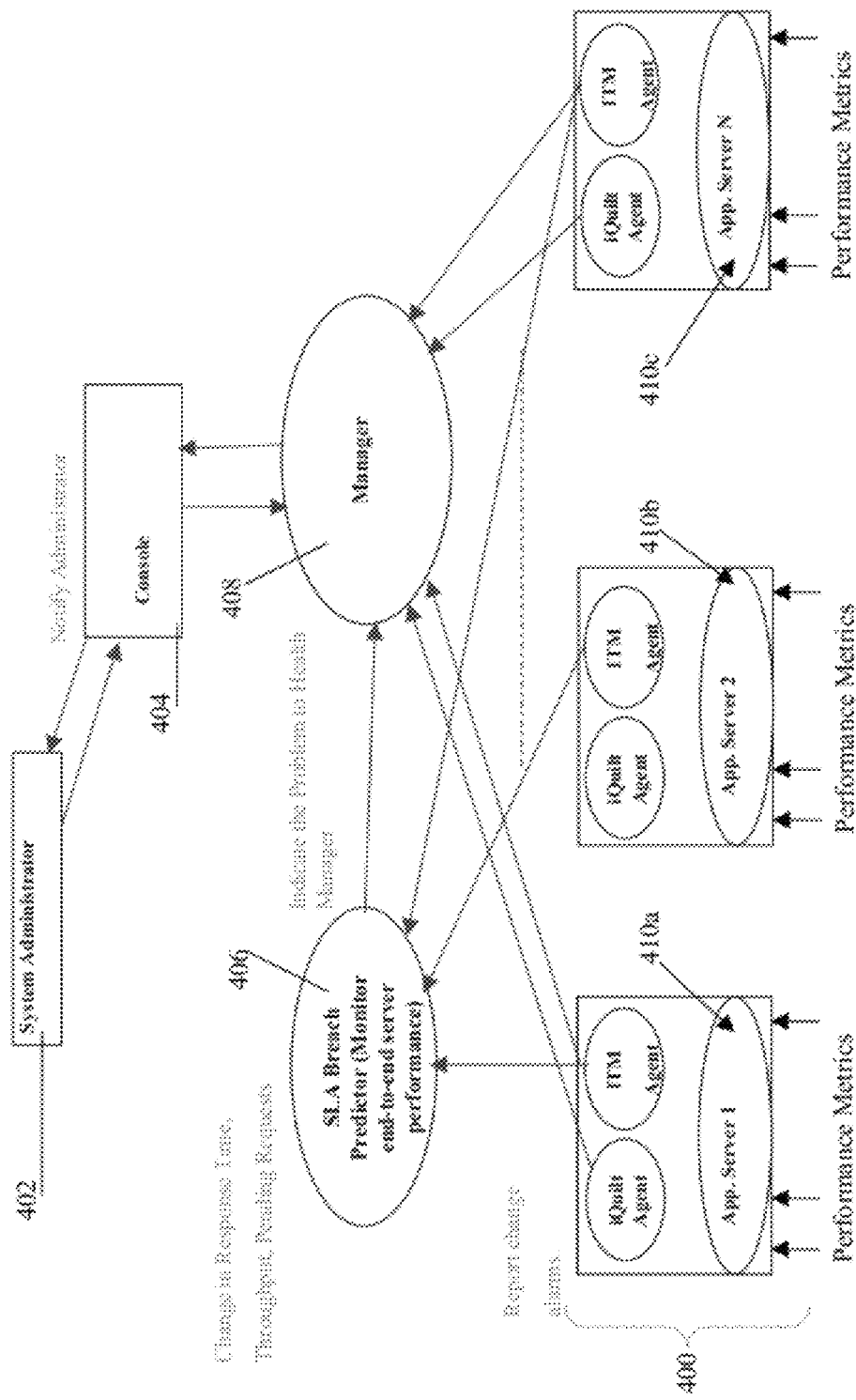
FIG. 4 schematically illustrates a system architecture.

FIG. 4 schematically depicts an architecture of a system in accordance with a presently preferred embodiment of the present invention. Monitoring Agents (MAs) can be installed on each of the N servers 410a/b/c in an SDP environment 400. Monitoring Agents preferably can be provided by tools such as ITM Agents and iQuilt Agents as shown in FIG. 4. ITM and iQuilt Agents are mentioned and shown here merely by way of illustrative and non-restrictive example, and of course other analogously functioning substitutes may be embployed for the purpose of providing Monitoring Agents in the context of at least one embodiment of the present invention, as broadly contemplated herein. The ITM Agent Builder, as developed by IBM, represents is a set of tools used for quickly creating, modifying, and testing agents that plug into the IBM Tivoli Monitoring infrastructure. These agents allow the user to collect and analyze data about the state and performance of different resources, such as disks, memory, CPU, and applications. iQuilt Agents, on the other hand, provide tools and techniques to automatically synthesize a "total picture" of a heterogeneous IT environment from scattered but related information pieces in an extensible manner. The "total picture" would involve different IT artifacts/resources and their relationships, whose information is available at various layers of abstractions (e.g., from business level to runtime middleware level), expressed in a machine analyzable form, enabling users to query it and perform sophisticated reasoning with it.

Each server 410a/b/c can preferably host one or more clients, and each client can be embodied by essentially any computer system, such as the one indicated at 100 in FIG. 1. MA's collect the raw time series data reported by performance metrics in this environment by polling different metrics of interest and feed this data to the SLA breach predictor (BP 406 and Health Manager (HM) 408. Performance metrics can include metrics such as CPU utilization, response time, thread pool size, free memory etc. BP 406 can trigger an alarm whenever it notices a change in the level of performance of one or more servers in the system.

The BP 406 is able to handle multitenancy situations. Particularly, the BP 406 differentiates the aggregated statistics (like response time, arrival rate etc.) for different tenants existing on the SDP platform. As discussed further above, the trigger generated by the BP 406 may be due to a fault in the system or due to change in operating conditions such as installation of a new application. A Manager (HM) 408 preferably resolves the problem once it receives the problem indicator from BP 406. Preferably, HM 408 represents the location of the core algorithm and updates the datagrid using the data fed to it by various performance metrics through agents. In case of a performance problem, an alert is preferably displayed at a console 404, wherein a system administrator 402 can access datagrid for management tasks through the console 404.

By way of brief recapitulation, there is broadly contemplated herein, a unified performance management technique in very dynamic environments such as SDPs, via using datagrid as broadly set forth and contemplated hereinabove. The datagrid can be used for various management tasks. To the extent that any conventional arrangements may involve the use of multiple models regarding the performance of system, such arrangements are highly limited in addressing solely one aspect of system management (e.g., solely fault management). Further, such conventional systems can detect faults solely in a very limited sense, i.e., when operating conditions are the same as when the model is recorded. Thus, such conventional arrangements hardly would be useful in the context of SDPs.

Generally, it should be appreciated that there are presented herein techniques that significantly outperform conventional arrangements in that learned models may be stored in a multi-dimensional datagrid, which itself can further be used for a variety of system management tasks under a broad range of operating scenarios.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
one or more processors executing computer readable program code estimating expected performance of prospective new clients and existing clients of a service delivery processing environment via:
the one or more processors executing the computer readable code providing a manager comprising a core algorithm, the manager being in communication with each of a plurality of servers;
the one or more processors executing the computer readable code providing a breach predictor in communication with the manager and the servers, wherein the breach predictor is configured to generate a problem indicator which is received by the manager;
the one or more processors executing the computer readable program code using the manager and breach predictor to obtain, from a monitoring agent located at each of the plurality of servers, raw performance data samples from clients via assimilating system parameter values;
the one or more processors executing the computer readable program code quantizing the system parameter values;
the one or more processors executing the computer readable program code plotting data corresponding to the raw performance data samples in a grid protocol and storing plotted data in a memory device;
wherein said plotting comprises the one or more processors executing the computer readable program code generating a data point from the quantized system parameter values;
the one or more processors executing the computer readable program code accessing the plotted data in the memory device to assign at least one bound corresponding to acceptable performance of the service delivery processing system;
the or more processors executing the computer readable program code ascertaining whether performance data of the service delivery processing system satisfies the at least one bound;
the or more processors executing the computer readable program code generating and plotting additional data points for a client via obtaining additional available performance data samples; and
the one or more processors executing the computer readable program code subdividing a data set corresponding to a client responsive to an increase in obtained additional available performance data samples above a threshold.

2. The method according to claim 1, wherein said plotting further comprises the one or more processors executing the computer readable program code mapping the quantized system parameter values to coordinates in a multi-dimensional space.

3. The method according to claim 1, further comprising the one or more processors executing the computer readable program code selectively re-merging subdivided data sets.

4. The method according to claim 1, wherein the problem indicator comprises a trigger that is responsive to a sudden change in client performance.

5. The method according to claim 4, further comprising, responsive to the trigger, the one or more processors executing the computer readable program code prompting a cessation in obtaining performance data samples.

6. The method according to claim 5, further comprising the or more processors executing the computer readable program code detecting a resumption of healthy client performance and thereupon prompting a resumption of obtaining performance data samples.

7. The method according to claim 4, wherein said plotting further comprises the or more processors executing the computer readable program code mapping the quantized system parameter values to coordinates in a multi-dimensional space.

8. The method according to claim 1, wherein the threshold relates to volatility of performance data samples.

9. The method according to claim 8, wherein the volatility of performance data samples is measured via a coefficient of variation.

10. The method according to claim 9, wherein the coefficient of variation is a function of a standard deviation and a mean of performance data samples.

\* \* \* \* \*